United States Patent
Lashbrook (10) Patent No.: US 11,452,034 B2
(45) Date of Patent: Sep. 20, 2022

(54) DISTANCE-BASED SERVING CELL SELECTION FOR COMMUNICATIONS BETWEEN AN AERIAL VEHICLE AND A CELLULAR RADIO ACCESS NETWORK

(71) Applicant: T-Mobile USA, Inc., Bellevue, WA (US)

(72) Inventor: Kyle Lashbrook, Seattle, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/833,064

(22) Filed: Mar. 27, 2020

(65) Prior Publication Data

US 2021/0306941 A1   Sep. 30, 2021

(51) Int. Cl.
| | | |
|---|---|---|
| H04W 64/00 | (2009.01) | |
| H04W 48/20 | (2009.01) | |
| H01Q 1/28 | (2006.01) | |
| H01Q 3/08 | (2006.01) | |
| B64C 39/02 | (2006.01) | |
| B64C 1/36 | (2006.01) | |
| B64D 41/00 | (2006.01) | |

(52) U.S. Cl.
CPC .............. *H04W 48/20* (2013.01); *B64C 1/36* (2013.01); *B64C 39/024* (2013.01); *B64D 41/00* (2013.01); *H01Q 1/28* (2013.01); *H01Q 3/08* (2013.01); *H04W 64/00* (2013.01); *B64C 2201/027* (2013.01)

(58) Field of Classification Search
CPC ........... H04W 48/20; H01Q 1/28; H01Q 3/08; B64C 1/36; G64C 39/024; B64D 41/00
See application file for complete search history.

(56) References Cited

U.S. PATENT DOCUMENTS

| | | | |
|---|---|---|---|
| 2018/0248613 A1* | 8/2018 | Peitzer | H04W 48/10 |
| 2020/0110424 A1* | 4/2020 | Oriani | G05D 1/0022 |
| 2020/0329410 A1* | 10/2020 | Hong | H04W 36/0007 |
| 2021/0022054 A1* | 1/2021 | Tsuda | H04W 8/02 |

OTHER PUBLICATIONS

Author Unknown, "LTE and Drones," Sequans Communications, www.sequans.com, 13 pages, 2018.
Raffelsberger et al., "A Performance Evaluation Tool for Drone Communications in 4G Cellular Neworks," Proceedings of the 15th International Symposium on Wireless Communication Systems (ISWCS '19), Oulu, Finland, pp. 27-30, Aug. 2019.

* cited by examiner

*Primary Examiner* — Muthuswamy G Manoharan
(74) *Attorney, Agent, or Firm* — Brownstein Hyatt Farber Schreck, LLP (57) ABSTRACT

A method of communicating between an aerial vehicle and a cellular radio access network is described. In some cases, the method includes determining a current location of the aerial vehicle; determining, in response to the current location, a location of a nearest cell of the cellular radio access network; and processing communications between the aerial vehicle and the cellular radio access network, using the nearest cell as a serving cell. When the method is performed on-board an aerial vehicle, the method further includes orienting a directional antenna of the aerial vehicle toward the location of the nearest cell.

18 Claims, 11 Drawing Sheets

DISTANCE-BASED SERVING CELL SELECTION FOR COMMUNICATIONS BETWEEN AN AERIAL VEHICLE AND A CELLULAR RADIO ACCESS NETWORK

FIELD

Embodiments described herein relate to aerial vehicles, cellular radio access networks, and communications between aerial vehicles and cellular radio access networks.

BACKGROUND

Aerial vehicles, and particularly unmanned aerial vehicles operating relatively closer to the earth's surface (e.g., drones), may be used for various purposes. These purposes include, for example, reconnaissance, mapping, delivery, communications, and purely recreational purposes. As the number of use cases for unmanned aerial vehicles (UAVs) has increased, so too has the type and robustness of UAV communications systems increased. Because of their relatively lower flight altitudes (in many cases), some UAVs may include a modem and antenna that enable the UAV's communications system to connect to a cellular radio access network. A UAV connected to a cellular radio access network may, for example, download reconnaissance photos or sensed parameters (e.g., weather information); provide streaming video of what the UAV sees; provide diagnostic information to a remote server or device; report the UAV's location; or receive an updated flight plan or other control information.

Some of the signals or information that a UAV may transmit or receive may be time-sensitive or include large payloads. As a result, it may be desirable to maintain a high reliability for the UAV's connection to a cellular radio access network. Systems, methods, devices, and apparatus that can be used to achieve or maintain the reliability, quality, continuity, or other aspects of a UAV's connection(s) to a cellular radio access network are therefore useful.

SUMMARY

This summary is provided to introduce a selection of concepts, in simplified form, that are further described in other sections. This summary is not intended to identify key features or essential features of the claimed subject matter, nor is it intended to be used as an aid in determining the scope of the claimed subject matter.

Described herein are unique systems, methods, devices, and apparatus that enable an aerial vehicle to communicate with a cellular radio access network. In some embodiments, the systems, methods, devices, and apparatus may employ a distance-based serving cell selection process instead of the typical signal strength-based serving cell selection process. In accord with a distance-based serving cell selection process, an aerial vehicle may issue a query for cells of a cellular radio access network (or issue a query for locations of cells of the cellular radio access network), which cells (or cell locations) are in the vicinity of the aerial vehicle. The aerial vehicle may then determine which of the cells (or cell locations) is nearest to its current location (e.g., by line of sight distance); operate an antenna steering mechanism (e.g., a motor) to direct an antenna lobe or beam of a directional antenna toward the location of the nearest cell; and establish communications with the cellular radio access network, using the nearest cell as a serving cell.

More specifically, an aerial vehicle is described herein. The aerial vehicle may include a frame, a directional antenna, a modem, a motor, and a processor. The modem may be configured to communicate with a cellular radio access network using the directional antenna. The motor may be attached to the directional antenna and the frame. The processor may be configured to determine a current location of the aerial vehicle; determine, in response to the current location, a location of a nearest cell of the cellular radio access network; and operate the motor to move the directional antenna with respect to the frame and direct an antenna lobe or beam of the directional antenna toward the location of the nearest cell.

Also disclosed is a UAV. The UAV may include an antenna, a modem, and a processor. The modem may be configured to communicate with a cellular radio access network using the antenna. The processor may be configured to determine that a set of one or more conditions is met and, at least partly in response to determining the set of one or more conditions is met, switch from using a signal-based serving cell selection process for the cellular radio access network to a distance-based serving cell selection process for the cellular radio access network.

Also disclosed is a method of communicating between an aerial vehicle and a cellular radio access network. The method may include determining a current location of the aerial vehicle; determining, in response to the current location, a location of a nearest cell of the cellular radio access network; and processing communications between the aerial vehicle and the cellular radio access network, using the nearest cell as a serving cell.

BRIEF DESCRIPTION OF THE DRAWINGS

The disclosure will be readily understood by the following detailed description in conjunction with the accompanying drawings, wherein like reference numerals designate like structural elements.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

When an aerial vehicle such as a drone is at altitude, and the aerial vehicle tries to connect to a cellular radio access network, the aerial vehicle may receive strong signals from multiple cells of the cellular radio access network, and the cell that provides the aerial vehicle with the strongest signal may change frequently. This can result in "ping-ponging" of the aerial vehicle's communications (i.e., frequent handovers of the aerial vehicle's communications, from one serving cell to another). Ping-ponging at a high rate can lead to deterioration in service reliability (e.g., deterioration in service quality and/or continuity). To lessen the chance of ping-ponging, an aerial vehicle may employ a distance-based serving cell selection process instead of the typical signal strength-based serving cell selection process.

In accord with a distance-based serving cell selection process, an aerial vehicle may issue a query for cells of a cellular radio access network (or issue a query for locations of cells of the cellular radio access network), which cells (or cell locations) are in the vicinity of the aerial vehicle. In some cases, the query may be transmitted to a remote server or device (e.g., a server or device that the aerial vehicle accesses via a current serving cell of the cellular radio access network. In other cases, the query may be executed locally, within a memory of the aerial vehicle. The query may include a current location of the aerial vehicle, and the current location may be used to filter a superset of cells managed by one or more mobile network operators (MNOs), so that a subset of the cells (or locations of the cells) may be returned or retrieved. From the returned or retrieved subset of cells, the aerial vehicle may determine which of the cells (or cell locations) is nearest to its current location (e.g., by line of sight distance). The aerial vehicle may then operate an antenna steering mechanism (e.g., a motor) to direct an antenna lobe or beam of a directional antenna toward the location of the nearest cell. This can reduce or eliminate interference from other cells; allow the aerial vehicle to establish communications with the nearest cell of the cellular radio access network, using the nearest cell as a serving cell; and reduce ping-ponging of the aerial vehicle's communications between serving cells.

The determination of the nearest cell and/or the aerial vehicle's current location may be made with more or less assistance from (and in some cases entirely by) one or more remote servers or devices connected to the cellular radio access network, or one or more servers or devices of a mobile network operator's core network.

Figure 1:
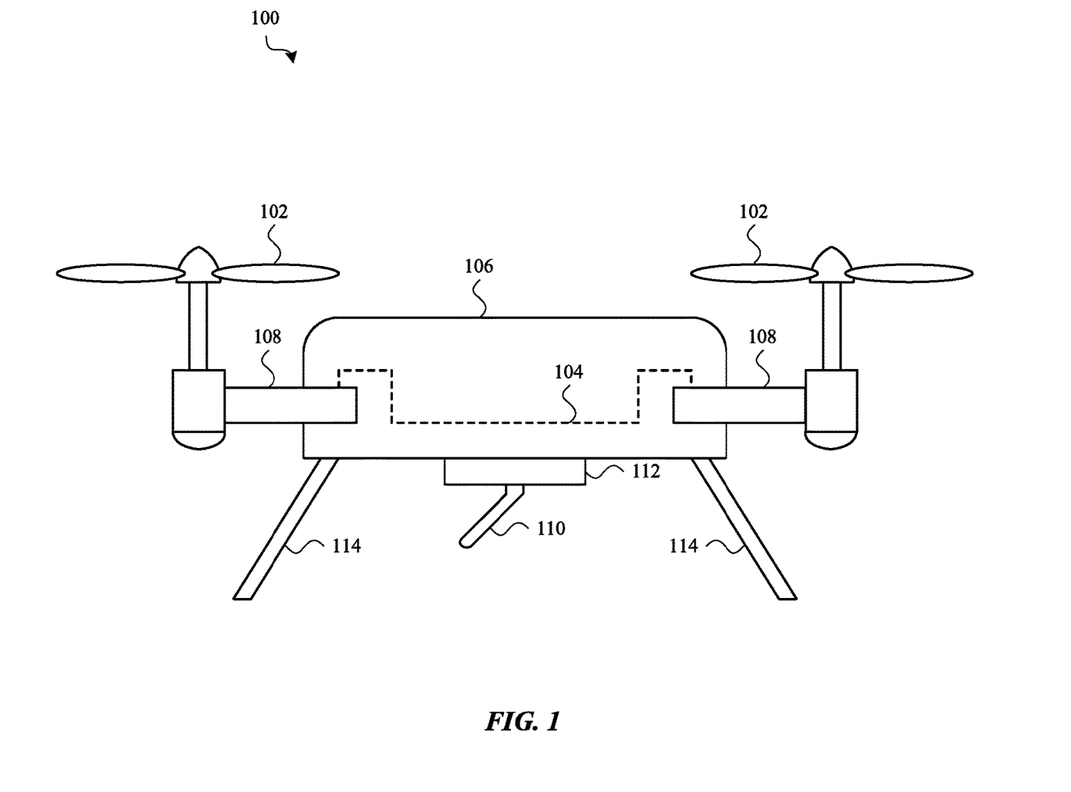
FIG. 1 shows an example aerial vehicle.

FIG. 1 shows an example aerial vehicle 100. The aerial vehicle 100 may be an unmanned aerial vehicle (UAV), such as a drone or unmanned glider, or a manned aerial vehicle, such as an airplane, helicopter, or manned glider. The aerial vehicle 100 may be powered or unpowered. By way of example, the aerial vehicle 100 is shown to include propellers 102 and is powered.

The aerial vehicle 100 may have a frame 104 to which a number of systems or components are attached. In some cases, the aerial vehicle 100 may also have a housing 106, or the frame may have one more extensions that function as a housing. Part or all of a number of systems or components may be attached to the frame 104 and/or be covered by the housing 106. The systems or components may include a flight system, a communications system, a processing system, a power system, a locating system, and/or other systems or components.

The flight system may include a set of propellers 102 that are used to lift, fly, and land the aerial vehicle 100. Each of the propellers 102 may be rotatably mounted to a respective arm 108 that is attached to and extends from the frame 104. Alternatively, the propellers 102 may be mounted directly to the frame 104, or to other types of elements that extend from the frame 104. In some embodiments, the flight system may include an additional and/or alternative form of propulsion mechanism (e.g., one or more jet engines), or the flight system may include wings, sails, an air-filled bladder, or other structures that enable the aerial vehicle 100 to fly or land after it is released at a high altitude (or launched to a high altitude).

The communications system may include one or more antennas, including at least one directional antenna 110 that is attached to the frame 104 by a motor 112. Alternatively, the directional antenna 110 may be rotatably or flexibly attached to the frame 104, and moved with respect to the frame 104 under control of a motor that is attached to the frame 104. In this alternative arrangement, the motor may be attached to an arm or other element that pushes, pulls, or otherwise moves (or flexes) the directional antenna with respect to the frame 104. In either case, and in some embodiments, the motor 112 may be a servo motor. As another alternative, the directional antenna may include an array of antenna elements (e.g., a phased array of antenna elements) that is steerable for the purpose of focusing a beam of communications (e.g., transmitted communications and/or received communications) in a particular direction. The directional antenna 110 may have an antenna lobe or beam (e.g., a relatively narrow beam), that can be directed toward a serving cell of a cellular radio access network by moving (or steering) the directional antenna 110.

In some embodiments, the aerial vehicle 100 may have a set of legs 114 attached to the frame 104. The set of legs 114 may keep various components of the aerial vehicle 100 from contacting (or resting on) a surface on which the aerial vehicle 100 lands or takes off from. In some embodiments, the set of legs 114 may be replaced or supplemented with a set of floats (i.e., floatation devices), a set of wheels, and so on.

Figure 2:
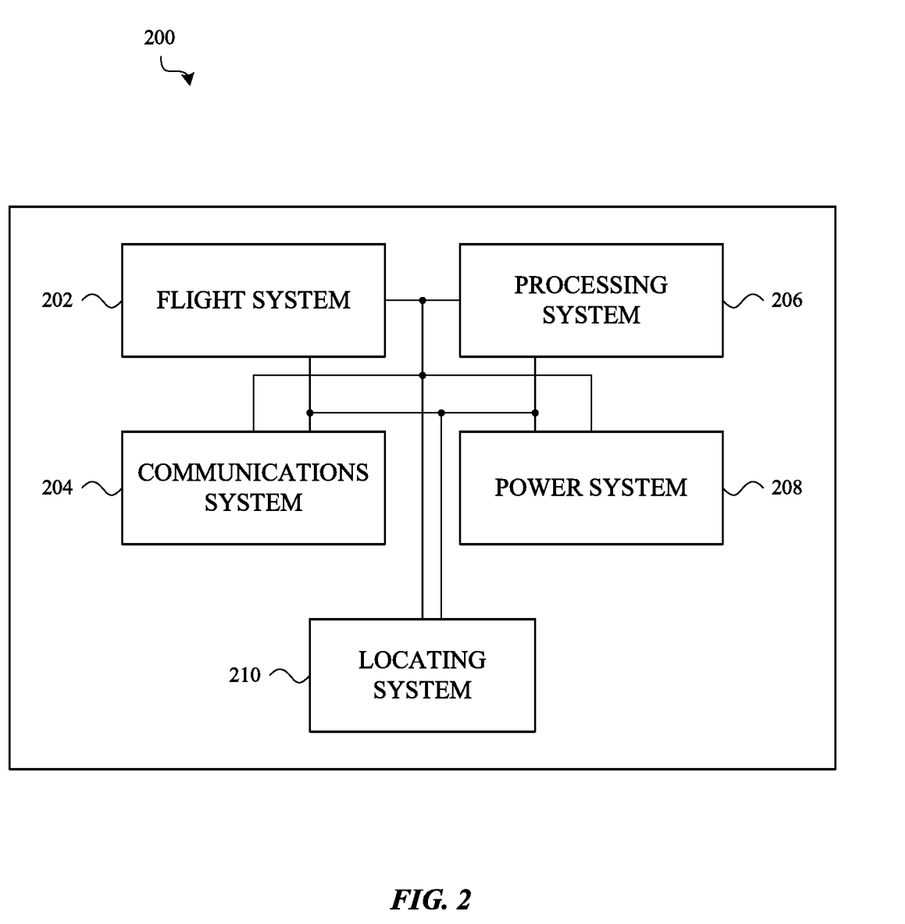
FIG. 2 shows an example block diagram of systems that may be included in an aerial vehicle.

FIG. 2 shows an example block diagram 200 of systems that may be included in an aerial vehicle. In some cases, the aerial vehicle may be the aerial vehicle described with reference to FIG. 1.

The systems that may be included in the aerial vehicle include a flight system 202, a communications system 204, a processing system 206, a power system 208, and/or a locating system 210. An aerial vehicle may also include other systems or components.

The flight system 202 may include a set of propellers. Alternatively or additionally, the flight system 202 may include another form of propulsion system, such as a jet engine. The flight system 200 may also or alternatively include wings, sails, or other structures that enable the aerial vehicle to fly or land after it is released at a high altitude (or launched to a high altitude).

The communications system 204 may include, for example, a modem and an antenna. In some embodiments, the antenna may include the directional antenna described with reference to FIG. 1. The communications system 204 may wirelessly communicate with one or more other devices using one or more radio access technologies (RATs) defined by the 3rd Generation Partnership Project (3GPP) fifth generation new radio (5G NR) standard (or related 5G standards), the 3GPP Long-Term Evolution (LTE) standard (or related 4G standards), the 3GPP Universal Mobile Telecommunications System (UMTS) standard (or related 3G standards), the 3GPP Global System for Mobile Communications (GSM) standard (or related 2G standards), Wi-Fi standards (e.g., IEEE 802.11 standards), and/or other standards. In some embodiments, the communications system may include more than one modem, more than one antenna, and/or other components.

The processing system 206 may be a central processing system or a distributed processing system. In a distributed processing system, for example, components of the processing system 206 may be distributed amongst (or shared with) the flight system 202, communications system 204, power system 208, locating system 210, and/or other systems or components. The processing system 206 may include a singular processor or multiple processors, as well as one or more memories. Each processor may take the form of a microprocessor, a microcontroller, a peripheral interface controller (PIC), and/or other type of processor. Each processor may be implemented in the form of an integrated circuit, a system-on-a-chip (SoC), an application-specific integrated circuit (ASIC), and so on.

The power system 208 may include a battery, a charging port, and so on, and may provide power to the flight system 202, the communications system 204, the processing system 206, the locating system 210, and/or other systems or components. In some cases, the power system 208 may additionally or alternatively include one or more of a fuel-based engine, a solar cell, and so on.

The locating system 210 may include a global positioning system (GPS) and/or camera, for example, and may be used to determine a location of the aerial vehicle.

In operation, the processing system 206 may operate the communications system 204 to establish communication with a ground-based communications network, such as a cellular radio access network or Wi-Fi network. The processing system 206 may communicate with the locating system 210 to determine a current location of the aerial vehicle. The processing system 206 may communicate with the flight system 202 to cause the aerial vehicle to lift, fly, or land. The processing system 206 may execute a flight plan, thereby causing the aerial vehicle to lift, fly, and land, using information obtained from the communications system 204 (e.g., location information and/or flight plan information), information obtained from the locating system 210 (e.g., a current location of the aerial vehicle), and/or information (e.g., a flight plan) stored in one or more local memories of the processing system 206.

Figure 3:
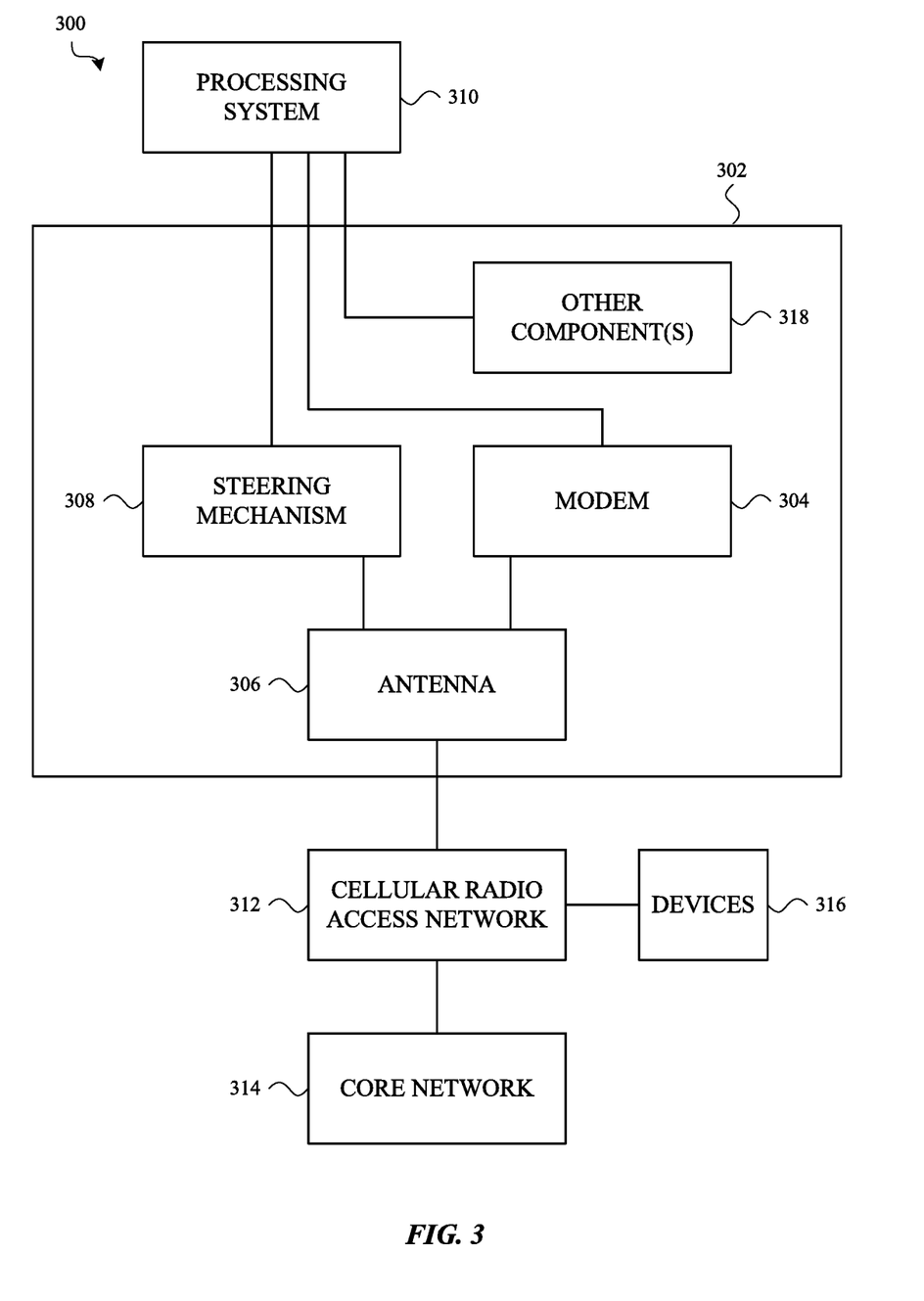
FIG. 3 shows an example block diagram of a communications system that may be included in an aerial vehicle.

FIG. 3 shows an example block diagram 300 of a communications system 302 that may be included in an aerial vehicle. In some cases, the communications system 302 may be an example of the communications system described with reference to FIG. 2.

The communications system 302 may include, for example, a modem 304 and an antenna 306 (e.g., a directional antenna). The communications system 302 may also include a steering mechanism 308 (e.g., a motor) for steering (or moving) the antenna 306 (e.g., a directional antenna). In some embodiments, the steering mechanism 308 may be integrated with the antenna (e.g., as a phased array of antenna elements).

In some embodiments, the modem 304 and antenna 306 may be used by a processing system 310 (e.g., the processing system described with reference to FIG. 2) to establish communication with a cellular radio access network 312. In these embodiments, the processing system 310 can communicate, via the communications system 302 and the cellular radio access network 312, with one or more servers or devices of the cellular radio access network 312; one or more servers or devices of a mobile network operator's core network 314; or one or more devices 316 that are connected to the cellular radio access network 312.

In some embodiments, the communications system 302 may include more than one modem or more than one antenna. For example, the modem 304 may transmit or receive wireless communications over multiple antennas—at different times or at the same time. The additional antennas may include directional and/or omnidirectional antennas. As another example, multiple modems 304 may communicate over different antennas, or may share access to one or more antennas.

In some embodiments, the communications system 302 may include additional components 318 (e.g., a modem and an antenna) for communicating over a Wi-Fi network or other non-cellular network.

Figure 4A:
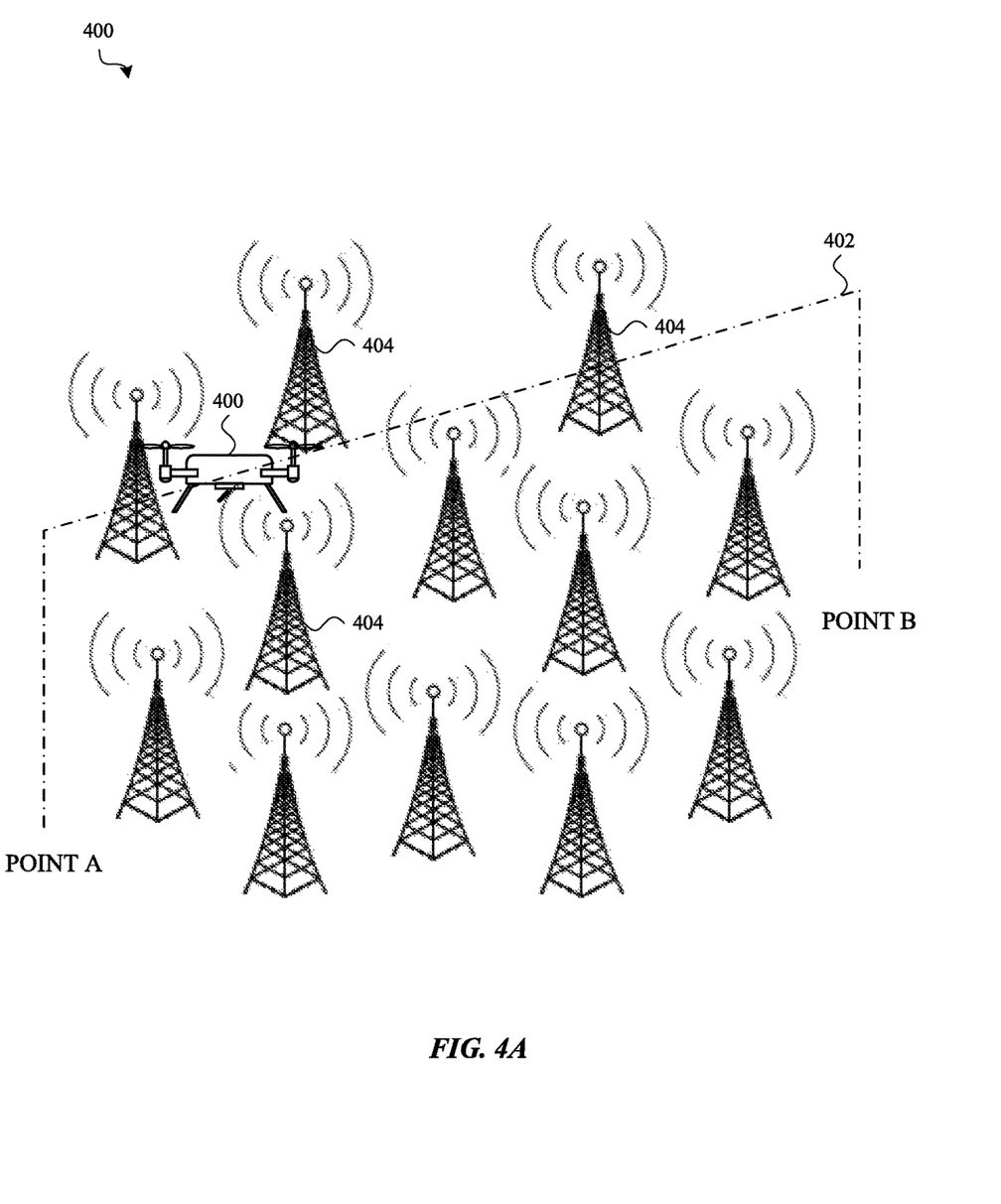
FIGS. 4A and 4B show an example flight path for an aerial vehicle.
Figure 4B:
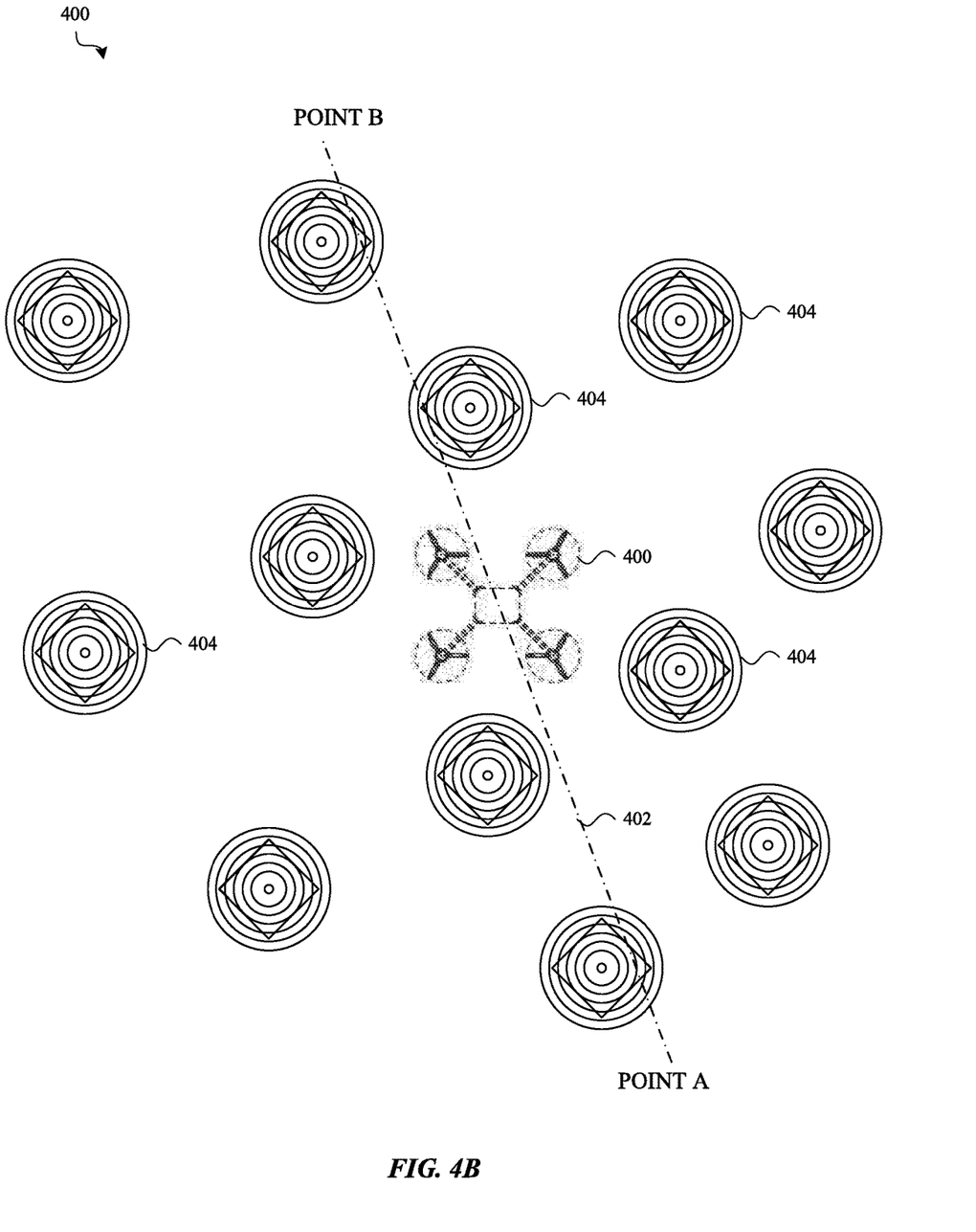

FIGS. 4A and 4B show an example flight path 402 for an aerial vehicle 400. FIG. 4A shows an elevation of the flight path 402, and FIG. 4B shows a plan view of the flight path 402. The aerial vehicle 400 may in some cases be the aerial vehicle described with reference to FIG. 1, an aerial vehicle including the systems described with reference to FIG. 2, or an aerial vehicle that includes the communications system described with reference to FIG. 3.

As shown in FIG. 4A, the aerial vehicle 400 may execute a flight plan that causes the aerial vehicle 400 to lift off from point A; ascend to a flight altitude; fly above the ground for a period of time; and then land at point B. The path that the aerial vehicle traverses from point A to point B is referred to herein as the aerial vehicle's flight path 402. Points A and B may be the same location or different locations, and may be on the ground, on water, on a ground-based or air-based launch vehicle, on a building or tower, and so on. By way of example, the points A and B are shown to be different points. The flight altitude may be a substantially constant altitude or an altitude that varies based on terrain, building heights, weather, the flight paths of other aerial vehicles, and so on.

The aerial vehicle 400 may wirelessly communicate with various networks and devices while flying. In some cases, the aerial vehicle 400 may also wirelessly communicate with various networks and devices while on the ground, on the water, on a launch vehicle, or when otherwise not flying. In some cases, the aerial vehicle 400 may establish communication with one or more cells 404 of a cellular radio access network. The cells 404 may include radios (or remote radio heads) mounted on dedicated towers. Alternatively, the cells 404 may be mounted or set on buildings, on the ground, on hills or mountains, on platforms, on other aerial vehicles, and so on. For purposes of this description, all of the locations where a cell 404 may be mounted or set will be colloquially and collectively referred to as "towers."

The aerial vehicle 400 may fly over or near multiple cells 404 as it executes its flight plan. FIG. 4A shows an example placement of cells 404 (or towers that carry the cells 404). FIG. 4B shows an example plan view of the cells 404 (or towers that carry the cells 404). In some cases, the aerial vehicle 400 may execute a longer, shorter, or different flight plan that takes it over or near more, fewer, or different towers and/or cells 404.

Because of the aerial vehicle's altitude when flying, it may have line of sight access to more than one cell 404 (or many cells 404). In some embodiments, the aerial vehicle 400 and/or a cellular radio access network may determine various parameters related to the aerial vehicle's ability to communicate with each cell 404 in a set of possible serving cells for the aerial vehicle 400. The determined parameter(s) may include, for example, determinations of signal strength, signal power, and/or signal quality. For example, the aerial vehicle 400 and/or each cell 404 capable of communicating with the aerial vehicle 400 may determine parameters such as a received signal strength indicator (RSSI), a reference signal received power (RSRP), or a reference signal received quality (RSRQ). Using these parameters and/or other parameters, the aerial vehicle 400 or cellular radio access network may select a serving cell for the aerial vehicle 400, and the aerial vehicle 400 may be handed over to the serving cell or otherwise establish communications with the serving cell. As the aerial vehicle 400 moves along its flight path 402, the optimum serving cell for the aerial vehicle 400 may change, and communications between the aerial vehicle 400 and the cellular radio access network may be handed over from one cell 404 to another. In some cases, the handovers may be initiated much the same as they would be for a mobile communications device (e.g., a user equipment (UE)) used in a car or on a train.

A problem with communications between an aerial vehicle and a cellular radio access network, however, is that an aerial vehicle flying at a reasonably high altitude can often receive strong signals (e.g., signals having high RSSI, RSRP, and/or RSRQ parameters) from multiple cells; the determined parameters for the signals (e.g., signal strengths) can be very close; and small fluctuations in the aerial vehicle's yaw, pitch, roll, heading, altitude, velocity, temperature; or changes in weather conditions; or fluctuations in power and so on of the cellular radio access network (and particular, its cells) can cause frequent changes in parameters such as RSSI, RSRP, and RSRQ parameters, leading to frequent handovers of the aerial vehicle's communications. In some cases, the aerial vehicle's serving cell may ping-pong (e.g., the aerial vehicle's cellular radio access network connection may be frequently handed over, from one cell to another cell), even though the aerial vehicle has not traveled sufficiently far to warrant a change in its serving cell. Such frequent handovers can greatly interfere with the aerial vehicle's ground-to-air (or equivalently, air-to-ground) communications.

To reduce the likelihood of frequent and possibly disruptive changes in an aerial vehicle's serving cell, an aerial vehicle's serving cell may be selected using a distance-based serving cell selection process instead of a more conventional signal-based serving cell selection process. Under a signal-based serving cell selection process, a serving cell may be selected in response to signal parameters such as RSSI, RSSP, and/or RSRQ. Under a distance-based serving cell selection process, a cell that is nearest to the aerial vehicle (e.g., by line of sight distance) may be selected as the aerial vehicle's serving cell. In some cases, a distance-based serving cell selection may be made by a processing system on-board the aerial vehicle, using information obtained by the on-board processing system. In other cases, a distance-based serving cell selection may be made by a remote processing system, such as a processing system of a cellular radio access network, or by a processing system of a server or other device of a core network to which the cellular radio access network connects, using information obtained by the remote processing system.

A distance-based serving cell selection may be made at periodic intervals (e.g., at predetermined times), or in response to a distance traveled by the aerial vehicle (e.g., at predetermined distance intervals). A distance-based serving cell selection may additionally or alternatively be made at other times, upon the satisfaction of one or more other conditions, or upon the occurrence of one or more events.

In some cases, an aerial vehicle may be configured to communicate with multiple serving cells contemporaneously. In these cases, a distance-based serving cell selection process may be used to select a set of nearest cells (i.e., cells nearest to the aerial vehicle) for use as serving cells.

FIGS. 5-10 show various example methods that may be used for communications between an aerial vehicle and a cellular radio access network. One or more of the methods may be performed by a processing system (or processor) of an aerial vehicle, or by a processing system (or processor) of a server or device of a cellular radio access network or core network.

Figure 5:
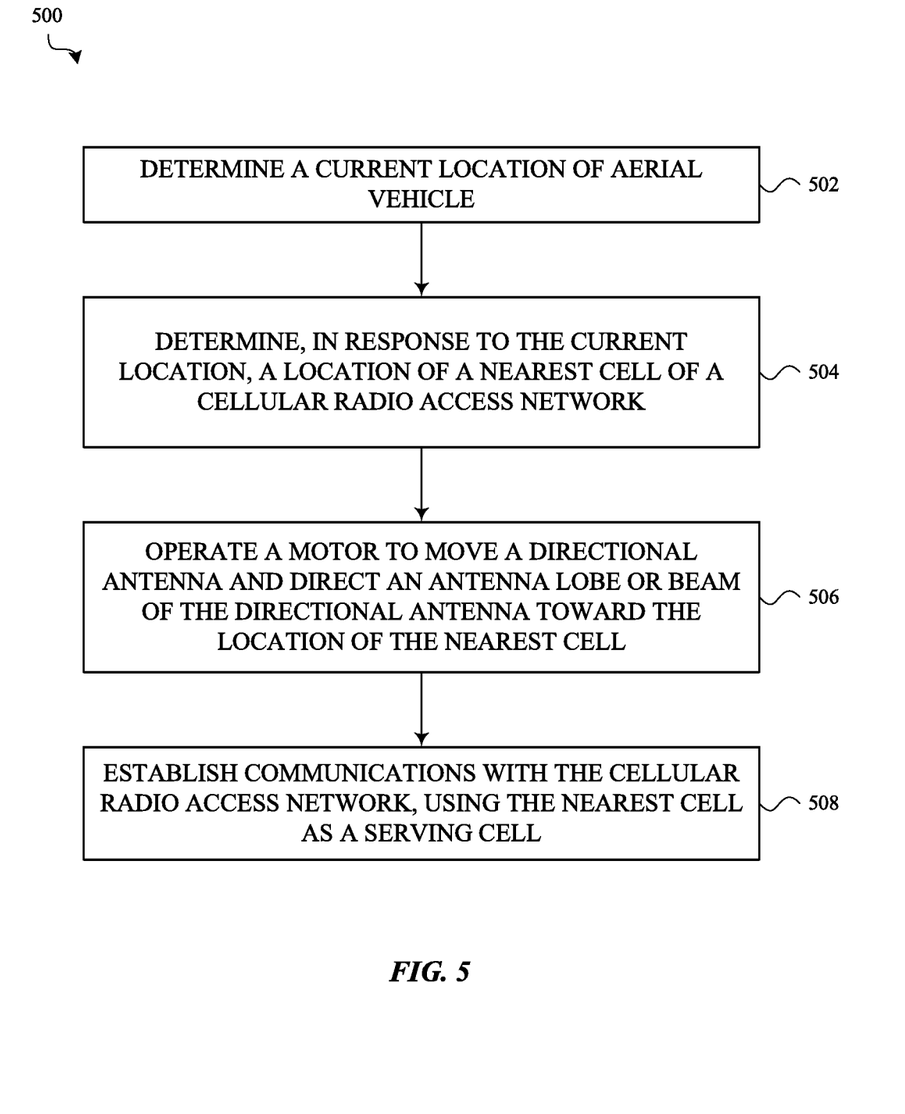
FIGS. 5-10 show various example methods that may be used for communications between an aerial vehicle and a cellular radio access network.

FIG. 5 shows a first example method 500 that may be used for communications between an aerial vehicle and a cellular radio access network. In some cases, the method 500 may be performed by the aerial vehicle described with reference to FIG. 1, 4A, or 4B. The method 500 may also or alternatively be performed by an aerial vehicle including the systems described with reference to FIG. 2, or by an aerial vehicle including the communications system described with reference to FIG. 3.

At block 502, a processor performing the method 500 (e.g., a processor of an aerial vehicle) may determine a current location of the aerial vehicle. In some embodiments, the processor may determine the current location by requesting the current location from a locating system of the aerial vehicle. For example, the processor may request (and/or receive) information from a global positioning system, and determine the current location from the received information. In some cases (e.g., in the case of a global positioning system), the received information may be the current location (i.e., no further processing may be needed to determine the current location). In some cases, the current location may be derived from information received from a locating system. For example, received information may include RSSI, RSSP, and/or RSRQ parameters for different cells, and the processing system may determine the current location of the aerial vehicle using the RSSI, RSSP, and/or RSRQ parameters, known locations of the serving cells, and a triangulation algorithm.

At block 504, the processor may determine, in response to the current location, a location of a nearest cell of the cellular radio access network.

At block 506, the processor may operate a motor of the aerial vehicle (e.g., a servo motor) to move a directional antenna of the aerial vehicle. The directional antenna may be moved with respect to a frame of the aerial vehicle, and may be moved to direct an antenna lobe or beam of the directional antenna toward the location of the nearest cell. Alternatively, the directional antenna may be moved in other ways (e.g., by adjusting a plurality of antenna elements of a phased array of antenna elements). In some cases, the processor may determine a heading (or vector) from the aerial vehicle to the nearest cell. In some cases, the processor may operate the motor to make a series of adjustments to the directional antenna's orientation. For example, the processor may periodically (or continuously) operate the motor to adjust the directional antenna's orientation, so that the lobe or beam of the directional antenna remains directed toward the nearest cell (or so a different lobe or beam of the directional antenna can be directed toward the nearest cell).

At block 508, the processor may optionally establish communications with the cellular radio access network, using the nearest cell as a serving cell. In some embodiments, the nearest cell may be set as the serving cell at block 508. Alternatively, the nearest cell may be set as the serving cell any time after the identity of the nearest cell is determined (e.g., at block 504 or after).

Figure 6:
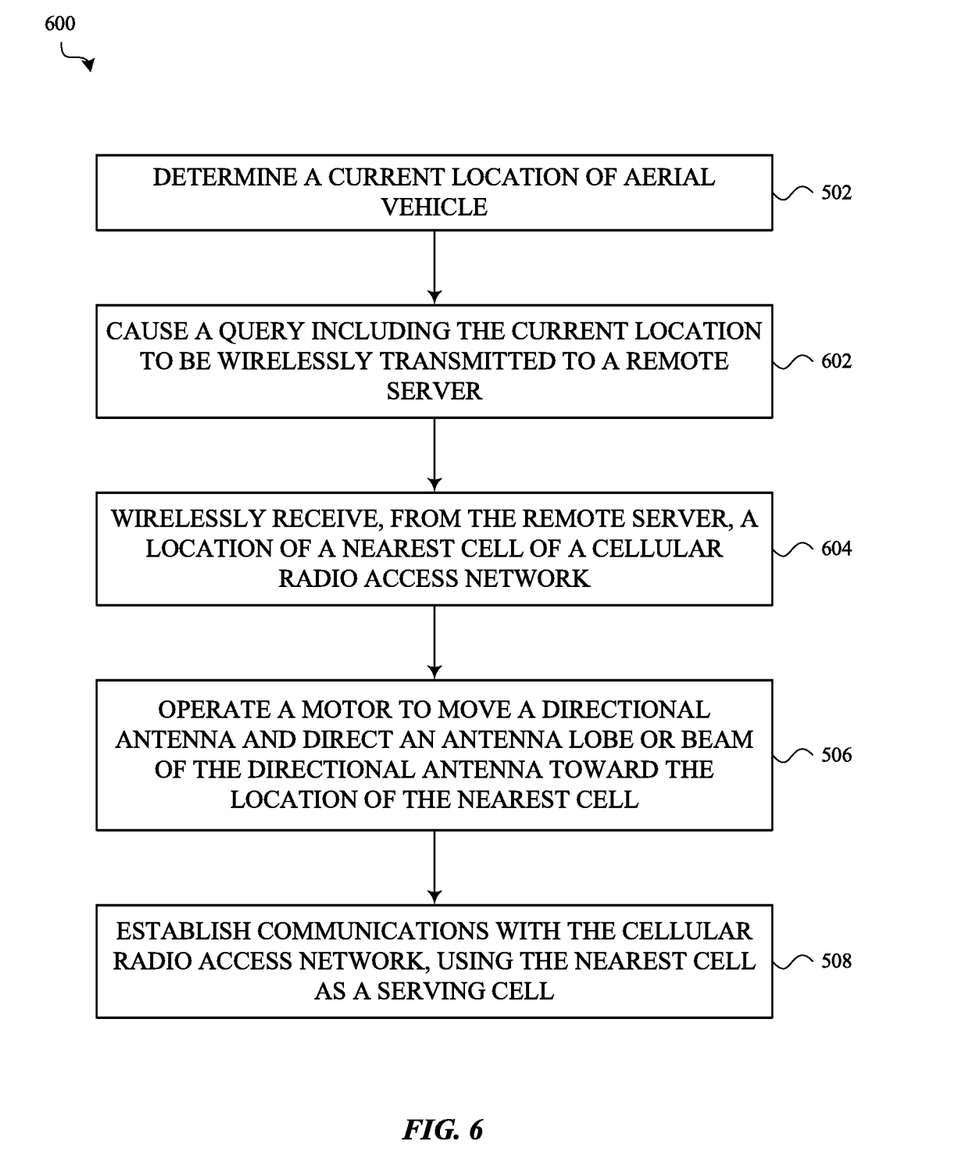

FIG. 6 shows a first more detailed example of the method described with reference to FIG. 5. In the method 600, like operations have been numbered the same as their counterpart operations in FIG. 5. The method 600 provides further details of the operations performed at block 504 of the method described in FIG. 5.

At blocks 602 and 604, a processor performing the method 600 (e.g., a processor of an aerial vehicle) may determine the location of the nearest cell by, at block 602, causing a query (e.g., a database query) including the current location to be wirelessly transmitted to a remote server; and at block 604, wirelessly receiving the location of the nearest cell from the remote server.

In some cases, the query may be transmitted to the remote server, at block 602, using a modem and directional antenna of the aerial vehicle. For example, the query may be transmitted to a remote server of a cellular radio access network (or, through the cellular radio access network, to a core network connected to the cellular radio access network). In other cases, the query may be transmitted to the remote server of the core network, or to a remote server of another network, using a wireless communications interface that is separate from the modem and directional antenna that are used to communicate with the cellular radio access network.

In the method 600, the nearest cell may be determined remotely, in response to the current location provided by the processor of the aerial vehicle. The location of the nearest cell may then be received and acted upon by the aerial vehicle. In contrast, and as described with reference to FIG. 7, the location of the nearest cell may be determined locally, by the processor of the aerial vehicle.

Figure 7:
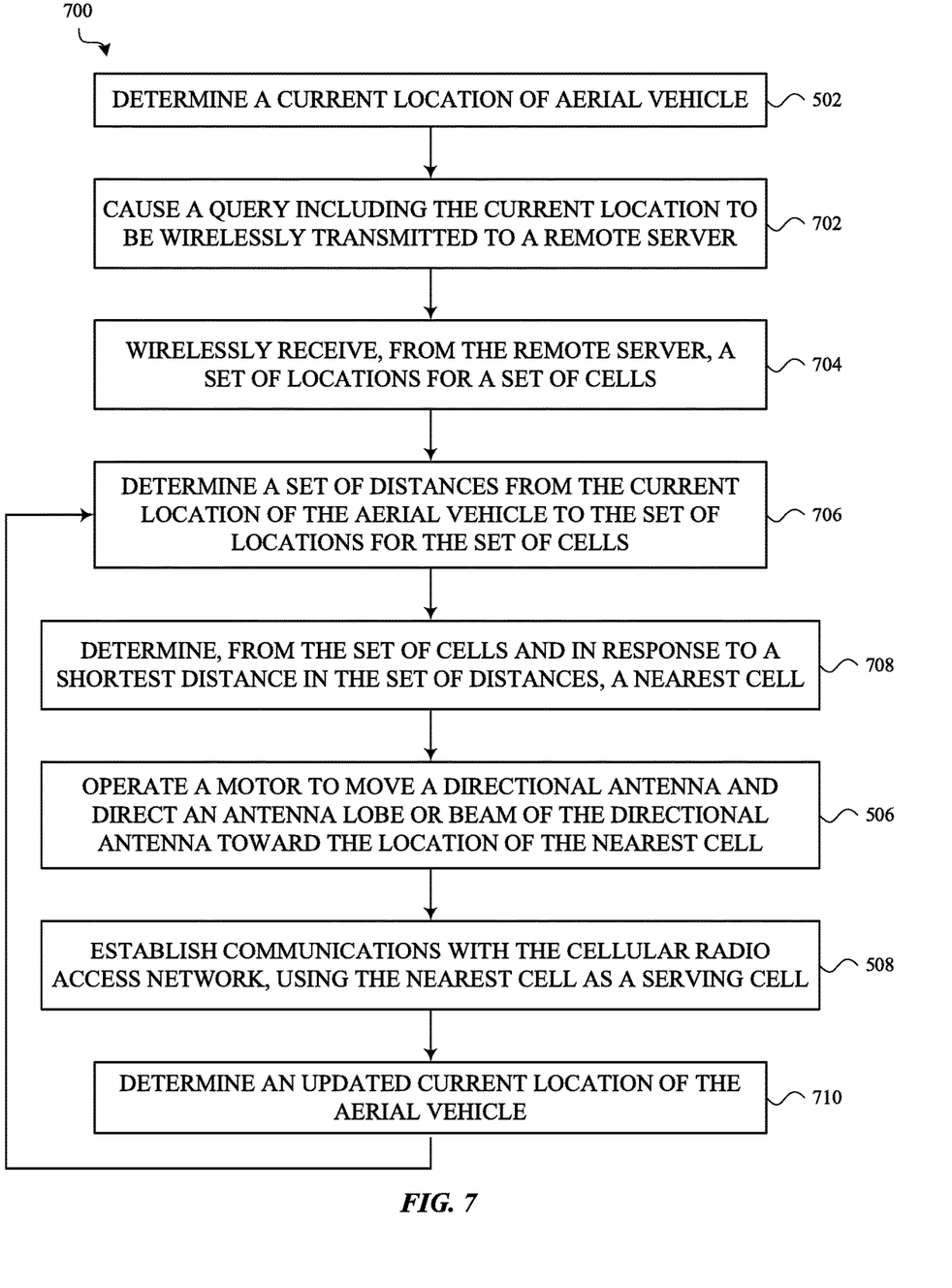

FIG. 7 shows a second more detailed example of the method described with reference to FIG. 5. In the method 700, like operations have been numbered the same as their counterpart operations in FIG. 5. The method 700 provides further details of the operations performed at block 504 of the method described in FIG. 5.

At blocks 702-708, a processor performing the method 700 (e.g., a processor of an aerial vehicle) may determine the location of the nearest cell. More particularly, and at block 702, the processor may cause a query (e.g., a database query) including the current location of the aerial vehicle to be transmitted to a remote server. In some cases, the query may be transmitted to the remote server, at block 702, using a modem and directional antenna of the aerial vehicle. For example, the query may be transmitted to a remote server of a cellular radio access network (or, through the cellular radio access network, to a core network connected to the cellular radio access network). In other cases, the query may be transmitted to the remote server of the core network, or to a remote server of another network, using a wireless communications interface that is separate from the modem and directional antenna that are used to communicate with the cellular radio access network.

At block 704, the processor may wirelessly receive from the remote server, in response to the query, a set of locations for a set of cells. At block 706, the processor may determine a set of distances from the current location of the aerial vehicle to the set of locations for the set of cells. In some embodiments, the distances may be actual distances, based on a determined or actual altitude of the aerial vehicle. In some embodiments, the distances may be estimated distances, based on an estimated, typical, or expected altitude of the aerial vehicle. At block 708, the processor may select, from the set of cells and in response to a shortest distance in the set of distances, the nearest cell.

In some embodiments, the set of cells may include cells within a radius of the current location received by the remote server. In some embodiments, the set of cells may include cells along a flight plan of the aerial vehicle. In some embodiments, the set of cells may include cells within a particular coverage area or region of a mobile network operator (including, for example, cells operated by the mobile network operator and/or cells that are licensed for use by the mobile network operator).

FIG. 7 illustrates how a received set of cells may be used to determine a location of a new or next serving cell as the aerial vehicle moves from one location to another location. For example, at block 710, and after establishing communications with the cellular radio access network using the previous "nearest cell" (or after being unable to establish such communications), the processor may determine an updated current location of the aerial vehicle. Flow of the method 700 may then return to block 706, where the processor may determine an updated set of distances from the current location of the aerial vehicle to the set of locations for the set of cells. At block 708, the processor may select, from the set of cells and in response to a shortest distance in the updated set of distances, an updated nearest cell. At block 506, the processor may operate the motor of the aerial vehicle to move the directional antenna of the aerial vehicle. The directional antenna may be moved to direct an antenna lobe or beam of the directional antenna toward the location of the updated serving cell. At block 508, the processor may establish communications with the cellular radio access network, using the nearest cell as a serving cell.

Figure 8:
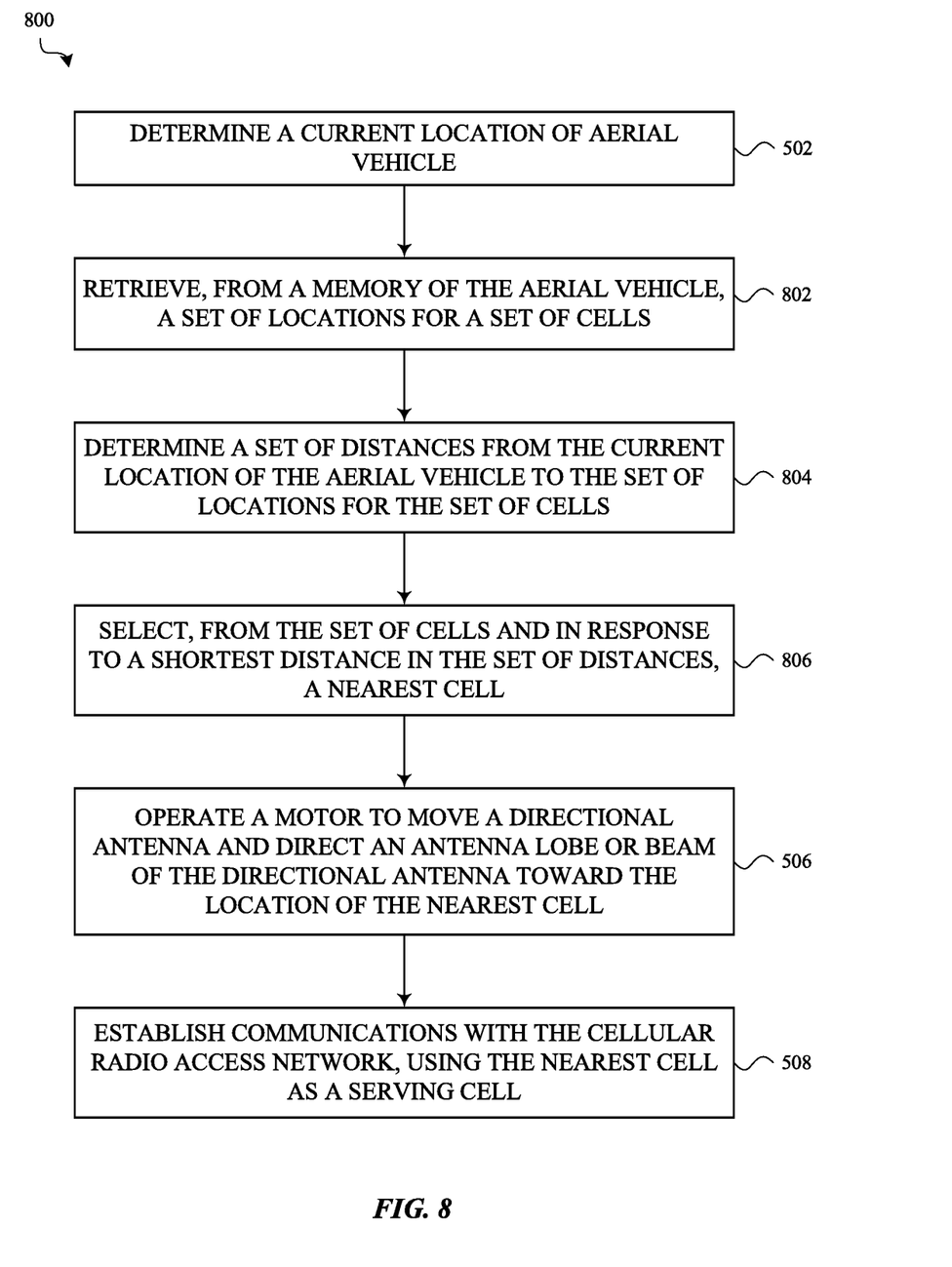

FIG. 8 shows a third more detailed example of the method described with reference to FIG. 5. In the method 800, like operations have been numbered the same as their counterpart operations in FIG. 5. The method 800 provides further details of the operations performed at block 504 of the method described in FIG. 5.

At blocks 802-806, a processor performing the method 800 (e.g., a processor of an aerial vehicle) may determine the location of the nearest cell. More particularly, and at block 802, the processor may retrieve, from a memory (i.e., a memory on-board the aerial vehicle (a local memory)), a set of locations for a set of cells. At block 804, the processor may determine a set of distances from the current location of the aerial vehicle to the set of locations for the set of cells. At block 806, the processor may select, from the set of cells and in response to a shortest distance in the set of distances, the nearest cell.

The methods described with reference to FIGS. 5-8 include a determination of an aerial vehicle's current location. This determination is made by the aerial vehicle (or by a processing system or processor on-board the vehicle). A determination of a location of a nearest cell is then made by the aerial vehicle, or by a remote server. In alternative methods, the current location of the aerial vehicle may be made by a remote server or device of a cellular radio access network or core network—e.g., using a triangulation algorithm. Alternatively, the current location of the aerial vehicle may be made by a remote server or device of a Wi-Fi network or other type of network that is capable of determining the aerial vehicle's current location using a triangulation algorithm or other means. In these methods, a location of a nearest cell (or location of a serving cell) may be wirelessly transmitted to the aerial vehicle. Alternatively, the locations of a set of cells may be transmitted to the aerial vehicle, or the aerial vehicle may have the locations of the set of cells pre-stored in a memory on-board the aerial vehicle, and the remote server or device may periodically transmit the current location of the aerial vehicle to the aerial vehicle. The aerial vehicle may then determine the location of a nearest cell.

The methods described with reference to FIGS. 5-8 are examples of distance-based serving cell selection processes. In some cases, one or more of the methods may be used by an aerial vehicle any time the aerial vehicle uses its communications system for cellular communications. In other cases, one or more of the methods may be used selectively, as shown, for example, in FIG. 9.

Figure 9:
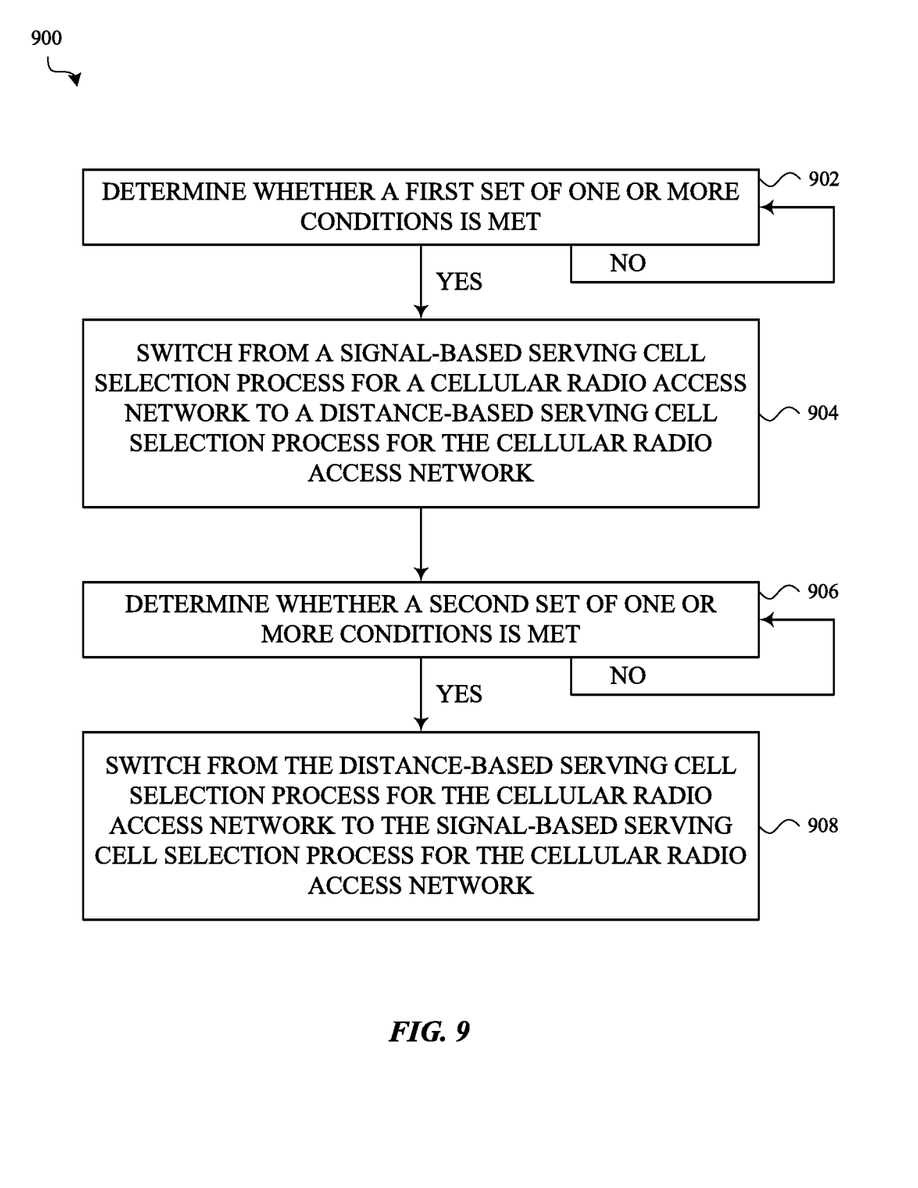

FIG. 9 shows another example method 900 that may be used for communications between an aerial vehicle and a cellular radio access network. In some cases, the method 900 may be performed by the aerial vehicle described with reference to FIG. 1, 4A, or 4B. The method 500 may also or alternatively be performed by an aerial vehicle including the systems described with reference to FIG. 2, or by an aerial vehicle including the communications system described with reference to FIG. 3.

At block 902, a processor that performs the method 900 (e.g., a processor of an aerial vehicle) may determine whether a first set of one or more conditions is met. The conditions may include, for example, one or more of: the aerial vehicle reaching a predetermined altitude; the aerial vehicle taking off or landing; the aerial vehicle determining it is ping-ponging between serving cells; and so on.

At block 904, and at least partly in response to determining that the first set of one or more conditions is met, the processor may switch from using a signal-based serving cell selection process for the cellular radio access network to a distance-based serving cell selection process for the cellular radio access network. In some cases, the distance-based serving cell selection process may include part or all of the method described with reference to any of FIGS. 5-8 (e.g., the determining the current location, the determining the location of the nearest cell, the operating the motor, and/or the establishing the communications with the cellular radio access network).

At block 906, the processor may determine whether a second set of one or more conditions is met. The conditions may include, for example, one or more of: the aerial vehicle reaching a predetermined altitude; the aerial vehicle taking off or landing; the aerial vehicle determining it is ping-ponging between serving cells; and so on. The set of one or more conditions may be the same as, or different from, the first set of one or more conditions. In some cases, the first and second sets of one or more conditions may include different parameters for a particular condition. The different parameters may provide some hysteresis for switching between the signal-based and distance-based serving cell selection processes. For example, the first set of one or more conditions may include a condition that the aerial vehicle ascend to a height of 100 meters, and the second set of one or more conditions may include a condition that the aerial vehicle descend to below 20 meters.

At block 908, and at least partly in response to determining that the second set of one or more conditions is met, the processor may switch from using a distance-based serving cell selection process for the cellular radio access network to a signal-based serving cell selection process for the cellular radio access network.

Figure 10:
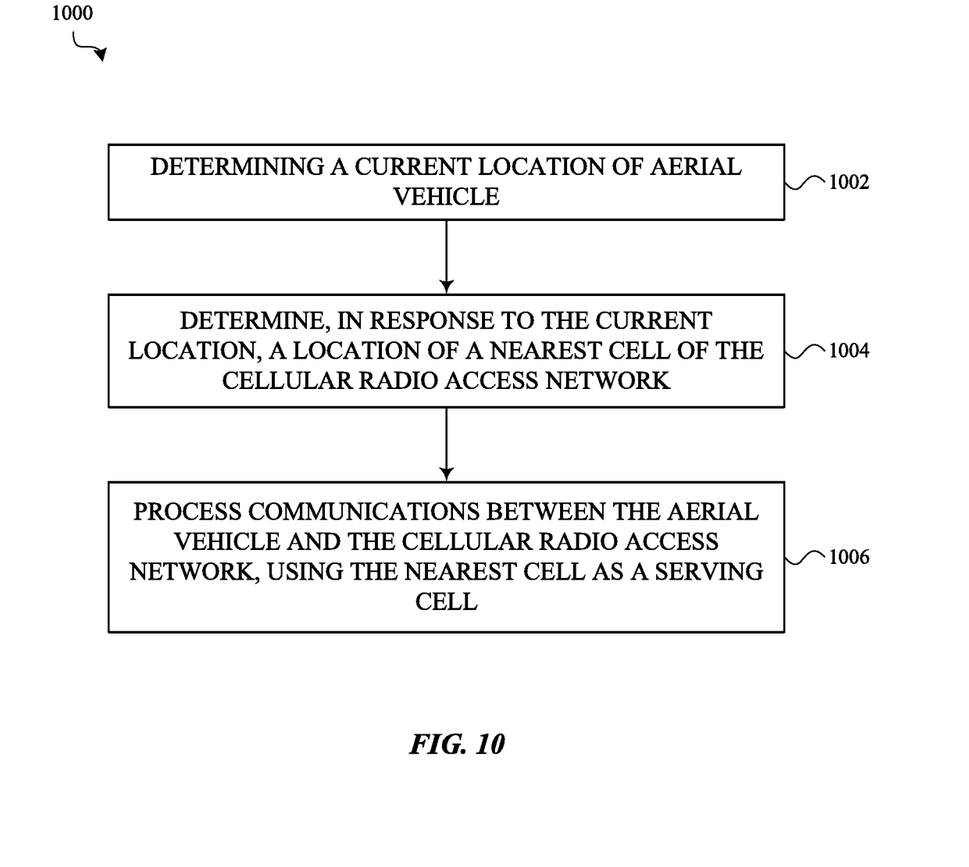

FIG. 10 shows another example method 1000 that may be used for communications between an aerial vehicle and a cellular radio access network. In some cases, the method 1000 may be performed by the aerial vehicle described with reference to FIG. 1, 4A, or 4B, or by the cellular radio access network described with reference to FIG. 4A or 4B, or by a core network to which the cellular radio access network connects. The method 1000 may also or alternatively be performed by an aerial vehicle including the systems described with reference to FIG. 2, or by an aerial vehicle including the communications system described with reference to FIG. 3.

At block 1002, the method 1000 may include determining a current location of the aerial vehicle.

At block 1004, the method 1000 may include determining, in response to the current location, a location of a nearest cell of the cellular radio access network.

At block 1006, the method 1000 may include processing communications between the aerial vehicle and the cellular radio access network, using the nearest cell as a serving cell.

In some embodiments, the method 1000 may be performed on-board the aerial vehicle. In some embodiments, the method 1000 may be performed by at least one of the cellular radio access network or a core network connected to the cellular radio access network.

When the method 1000 is performed on-board the aerial vehicle, the method 1000 may further include receiving the location of the nearest cell via the cellular radio access network. Alternatively, the method 1000 may further include receiving, via the cellular radio access network, a set of locations for a set of cells; determining a set of distances from the current location of the aerial vehicle to the set of locations for the set of cells; and selecting, from the set of cells and in response to a shortest distance in the set of distances, the nearest cell. In either case, when the method 1000 is performed on-board the aerial vehicle, the method 1000 may include orienting a directional antenna of the aerial vehicle toward the location of the nearest cell. Orienting the directional antenna may include orienting a lobe or beam of the directional antenna.

When the method 1000 is performed by at least one of the cellular radio access network or a core network connected to the cellular radio access network, the method 1000 may include transmitting the location of the nearest cell from the cellular radio access network to the aerial vehicle.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An aerial vehicle, comprising:
a frame;
a directional antenna;
a modem configured to communicate with a cellular radio access network using the directional antenna;
a motor attached to the directional antenna and the frame; and
a processor configured to:
determine the aerial vehicle has ascended to a predetermined altitude;
switch from using a signal strength-based serving cell selection process for the cellular radio access network to a distance-based serving cell selection process for the cellular radio access network, the switch made at least partly in response to determining the aerial vehicle has ascended to the predetermined altitude, and the distance-based serving cell selection process excluding signal strength as a factor in selecting a serving cell; and
perform the distance-based serving cell selection process by,
determining a current location of the aerial vehicle;
determining, at least partly in response to the current location, a location of a nearest cell of the cellular radio access network; and
operating the motor to move the directional antenna with respect to the frame and direct an antenna lobe or beam of the directional antenna toward the location of the nearest cell.

2. The aerial vehicle of claim 1, wherein:
the processor is configured to:
establish communications with the cellular radio access network, using the nearest cell as a serving cell.

3. The aerial vehicle of claim 1, wherein:
the processor is configured to:
cause a query including the current location to be wirelessly transmitted to a remote server; and
wirelessly receive the location of the nearest cell from the remote server.

4. The aerial vehicle of claim 1, wherein:
the processor is configured to:
cause a query including the current location to be wirelessly transmitted to a remote server;
wirelessly receive, from the remote server, a set of locations for a set of cells;
determine a set of distances from the current location of the aerial vehicle to the set of locations for the set of cells; and
determine, from the set of cells and in response to a shortest distance in the set of distances, the location of the nearest cell.

5. The aerial vehicle of claim 4, wherein:
the processor is configured to:
determine an updated current location of the aerial vehicle;
determine an updated set of distances from the updated current location of the aerial vehicle to the set of locations for the set of cells;
determine, from the set of cells and in response to a shortest distance in the updated set of distances, a location of an updated nearest cell; and
operate the motor to direct the antenna lobe or beam of the directional antenna toward the location of the updated nearest cell.

6. The aerial vehicle of claim 1, further comprising:
a memory; wherein:
the processor is configured to:
retrieve, from the memory, a set of locations for a set of cells;
determine a set of distances from the current location of the aerial vehicle to the set of locations for the set of cells; and
select, from the set of cells and in response to a shortest distance in the set of distances, the nearest cell.

7. The aerial vehicle of claim 1, further comprising:
a global positioning system; wherein,
the processor is configured to determine the current location of the aerial vehicle using information received from the global positioning system.

8. The aerial vehicle of claim 1, wherein:
the processor is configured to:
cause a query including the current location to be wirelessly transmitted to a remote server using the modem and the directional antenna.

9. The aerial vehicle of claim 1, further comprising:
a wireless communications interface separate from the modem and the directional antenna; wherein,
the processor is configured to:
cause a query including the current location to be wirelessly transmitted to a remote server using the wireless communications interface.

10. The aerial vehicle of claim 1, wherein the motor comprises a servo motor.

11. An unmanned aerial vehicle, comprising:
an antenna;
a modem configured to communicate with a cellular radio access network using the antenna; and
a processor configured to:
determine that a set of one or more conditions is met, the set of one or more conditions including a condition that the unmanned aerial vehicle has ascended to a predetermined altitude; and
switch from using a signal strength-based serving cell selection process for the cellular radio access network to a distance-based serving cell selection process for the cellular radio access network, the switch made at least partly in response to determining the set of one or more conditions, including the condition that the unmanned aerial vehicle has ascended to the predetermined altitude, is met, and the distance-based serving cell selection process excluding signal strength as a factor in selecting a serving cell.

12. The unmanned aerial vehicle of claim 11, wherein the antenna comprises a directional antenna.

13. The unmanned aerial vehicle of claim 11, wherein:
the set of one or more conditions is a first set of one or more conditions; and
the processor is configured to:
determine that a second set of one or more conditions is met; and
switch from using the distance-based serving cell selection process for the cellular radio access network to the signal strength-based serving cell selection process for the cellular radio access network, at least partly in response to determining the second set of one or more conditions is met.

14. A method of communicating between an aerial vehicle and a cellular radio access network, comprising:
   determining the aerial vehicle has ascended to a predetermined altitude;
   switching from using a signal strength-based serving cell selection process for the cellular radio access network to a distance-based serving cell selection process for the cellular radio access network, the switch made at least partly in response to determining the aerial vehicle has ascended to the predetermined altitude, and the distance-based serving cell selection process excluding signal strength as a factor in selecting a serving cell; and
   perform the distance-based serving cell selection process by,
      determining a current location of the aerial vehicle;
      determining, at least partly in response to the current location, a location of a nearest cell of the cellular radio access network; and
      processing communications between the aerial vehicle and the cellular radio access network, using the nearest cell as a serving cell.

15. The method of claim 14, further comprising:
   orienting a directional antenna of the aerial vehicle toward the location of the nearest cell.

16. The method of claim 14, wherein the method is performed on-board the aerial vehicle, the method further comprising:
   receiving the location of the nearest cell via the cellular radio access network.

17. The method of claim 14, wherein the method is performed on-board the aerial vehicle, the method further comprising:
   receiving, via the cellular radio access network, a set of locations for a set of cells;
   determining a set of distances from the current location of the aerial vehicle to the set of locations for the set of cells; and
   selecting, from the set of cells and in response to a shortest distance in the set of distances, the nearest cell.

18. The method of claim 14, wherein the method is performed by at least one of the cellular radio access network or a core network connected to the cellular radio access network, the method further comprising:
   transmitting the location of the nearest cell from the cellular radio access network to the aerial vehicle.

* * * * *